US008073789B2

(12) United States Patent
Wang et al.

(10) Patent No.: US 8,073,789 B2
(45) Date of Patent: Dec. 6, 2011

(54) METHOD AND SYSTEM FOR WEB RESOURCE LOCATION CLASSIFICATION AND DETECTION

(75) Inventors: Chuang Wang, Wuhan (CN); Wei-Ying Ma, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/539,555

(22) Filed: Aug. 11, 2009

(65) Prior Publication Data

US 2010/0010945 A1    Jan. 14, 2010

Related U.S. Application Data

(62) Division of application No. 11/081,014, filed on Mar. 10, 2005, now Pat. No. 7,574,530.

(51) Int. Cl.
*G06N 5/00* (2006.01)
(52) U.S. Cl. .............................. 706/12; 706/45
(58) Field of Classification Search ............... 706/12, 706/45
See application file for complete search history.

(56) References Cited

U.S. PATENT DOCUMENTS

| | | | |
|---|---|---|---|
| 4,780,717 A | 10/1988 | Takanabe et al. | |
| 5,948,040 A | 9/1999 | DeLorme et al. | |
| 6,516,311 B1 | 2/2003 | Yacoby et al. | |
| 6,629,136 B1 | 9/2003 | Naidoo | |
| 6,684,250 B2 | 1/2004 | Anderson et al. | |
| 6,731,612 B1 | 5/2004 | Koss | |
| 6,795,710 B1 | 9/2004 | Creemer | |
| 6,885,860 B2 | 4/2005 | Bahl et al. | |
| 6,973,438 B1 | 12/2005 | Philyaw | |
| 6,976,090 B2 | 12/2005 | Ben-Shaul et al. | |
| 7,158,780 B2 | 1/2007 | Bahl et al. | |
| 7,231,405 B2 | 6/2007 | Xia | |
| 7,257,570 B2 | 8/2007 | Riise et al. | |
| 7,257,577 B2 | 8/2007 | Fagin et al. | |
| 7,574,530 B2 | 8/2009 | Wang et al. | |
| 7,606,875 B2 | 10/2009 | Xie et al. | |
| 7,650,431 B2 | 1/2010 | Wang et al. | |
| 7,792,870 B2 * | 9/2010 | Field et al. | 707/802 |
| 2001/0013013 A1 | 8/2001 | Takenaga | |

(Continued)

FOREIGN PATENT DOCUMENTS

KP    102005035386    4/2005

(Continued)

OTHER PUBLICATIONS

Joachims, Text Categorization with Support Vector Machines: Learning with Many Relevant Features, Machine Learning: ECML-98, Lecture Notes in Computer Science, 1998, vol. 1398/1998, pp. 137-142.*

(Continued)

*Primary Examiner* — Wilbert L Starks
(74) *Attorney, Agent, or Firm* — Perkins Coie LLP

(57) ABSTRACT

A method and system for identifying locations associated with a web resource is provided. The location system identifies three different types of geographic locations: a provider location, a content location, and a serving location. A provider location identifies the geographic location of the entity that provides the web resource. A content location identifies the geographic location that is the subject of the web resource. A serving location identifies the geographic scope that the web page reaches. An application can select to use the type of location that is of particular interest.

18 Claims, 15 Drawing Sheets

U.S. PATENT DOCUMENTS

| | | |
|---|---|---|
| 2002/0095333 A1 | 7/2002 | Jokinen et al. |
| 2002/0119788 A1 | 8/2002 | Parupudi et al. |
| 2002/0156779 A1 | 10/2002 | Elliott et al. |
| 2003/0182195 A1 | 9/2003 | Kumar |
| 2003/0216930 A1 | 11/2003 | Dunham et al. |
| 2003/0220835 A1 | 11/2003 | Barnes |
| 2004/0083133 A1 | 4/2004 | Nicholas et al. |
| 2004/0204842 A1 | 10/2004 | Shinozaki |
| 2004/0225562 A1 | 11/2004 | Turner |
| 2005/0021403 A1 | 1/2005 | Ozer et al. |
| 2005/0065916 A1 | 3/2005 | Ge et al. |
| 2005/0065959 A1 | 3/2005 | Smith et al. |
| 2005/0085959 A1 | 4/2005 | Feyereisen |
| 2005/0195219 A1 | 9/2005 | Hirono |
| 2005/0216547 A1 | 9/2005 | Foltz-Smith et al. |
| 2006/0059225 A1 | 3/2006 | Stonehocker et al. |
| 2006/0143266 A1 | 6/2006 | Ohto et al. |
| 2006/0206624 A1 | 9/2006 | Wang et al. |
| 2006/0212350 A1 | 9/2006 | Ellis et al. |
| 2006/0235875 A1 | 10/2006 | Wen et al. |
| 2006/0271531 A1 | 11/2006 | O'Clair et al. |
| 2006/0282455 A1 | 12/2006 | Lee et al. |
| 2007/0192164 A1 | 8/2007 | Nong et al. |
| 2007/0233649 A1 | 10/2007 | Wang et al. |
| 2008/0052151 A1 | 2/2008 | Xie et al. |
| 2008/0052413 A1 | 2/2008 | Wang et al. |
| 2008/0134042 A1 | 6/2008 | Jankovich |

FOREIGN PATENT DOCUMENTS

| | | |
|---|---|---|
| KP | 102005066778 | 6/2005 |
| KP | 1020060082219 | 7/2006 |
| KR | 1020040028832 | 4/2004 |

OTHER PUBLICATIONS

"City-Data.Com," http://www.city-data.com [last accessed Feb. 23, 2007].

"Geographic Names Information System (GNIS)," http://geonames.usgs.gov/, [last accessed Feb. 23, 2007].

"Google Local Search," http://www.google.com/local, [last accessed Feb. 23, 2007].

"MSN Local Search and Microsoft MapPoint," http://mappoint.msn.com, [last accessed Feb. 23, 2006].

"North American Numbering Plan," http://sd.wareonearth.com/~phil/npanxx, [last accessed Feb. 23, 2007].

"Open Directory Project," http://dmoz.org/, [last accessed Feb. 23, 2007].

"SPIRIT project," http://www.geo-spirit.org, [last accessed Feb. 23, 2006].

"USPS—The United States Postal Services," http://www.usps.com, [last accessed Feb. 23, 2007].

"Yahoo Directory," http://dir.yahoo.com/, [last accessed Feb. 13, 2007].

"Yahoo Local," http://local.yahoo.com, [last accessed Feb. 26, 2007].

"Yahoo Regional," http://www.yahoo.com/regional, [last accessed Feb. 13, 2007].

Amitay, Einat et al., "Web-a-where: Geotagging Web Content," SIGIR'04, Sheffield, South Yorkshire, UK, © 2004 ACM, pp. 273-280.

Beckmann, Norbert et al., "The R-tree: An Efficient and Robust Access Method for Points and Rectangles," Proceedings of the 1990 ACM SIGMOD International Conference on Management of Data, Atlantic City, New Jersey, © 1990 ACM, pp. 322-331.

Brin, Sergey and Lawrence Page, "The Anatomy of a Large-Scale Hypertextual Web Search Engine," 7th WWW, 1998, 20 pages.

Burges, Christopher J.C., "A Tutorial on Support Vector Machines for Pattern Recognition," Data Mining and Knowledge Discovery, 2, 1998, © 1998 Kluwer Academic Publishers, pp. 121-167.

Buyukkokten, Orkut et al., "Exploiting Geographical Location Information of Web Pages," Proceedings of the ACM SIGMOD Workshop on the Web and Databases, Jun. 1999, pp. 91-96.

Chakrabarti, Soumen et al., "Enhanced hypertext categorization using hyperlinks," ACM SIGMOD 1998, Seattle, Washington, 12 pages.

Columbia GeoSearch. Available at <http://geosearch.cs.columbia.edu>. Cited in Wang et al "Application-driven Web Resource Location Detection", CIKM '04, Nov. 8-13, 2004, Washington D.C., 8 pages. <http://geosearch.cs.columbia.edu/>.

Davison, Brian D., "Topical Locality in the Web: Experiments and Observations," Jul. 2000, Technical Report DCS-TR-414, Department of Computer Science, Rutgers University, pp. 1-22.

Ding, Junyan et al., "Computing Geographical Scopes of Web Resources," Proceedings of the 26th VLDB Conference, Cairo, Egypt, 2000, pp. 545-556.

Dumais, Susan and Hao Chen, "Hierarchical Classification of Web Content," SIGIR 2000, Athens, Greece, © 2000 ACM, pp. 256-263.

Geotags GeoSearch. http://www.geotags.com.

Glover, Eric J. et al., "Using Web Structure for Classifying and Describing Web Pages," WWW2002, May 2002, Honolulu, Hawaii, ACM, pp. 562-569.

Gravano, Luis et al., "Categorizing Web Queries According to Geographical Locality," CIKM'03, Nov. 2003, New Orleans, Louisiana, © 2003 ACM, 9 pages.

Gravano, Luis, "GeoSearch: A Geographically-Aware Search Engine," http://geosearch.cs.columbia.edu, [last accessed Feb. 23, 2007].

Guttman, Antonin, "R-Trees: A Dynamic Index Structure for Spatial Searching," © 1984 ACM, pp. 47-57.

Hearst, Marti A., "Trends & Controversies—Support vector machines," IEEE Intelligent Systems, Jul./Aug. 1998, pp. 18-28.

Hill, Linda L. et al., "Geographic Names," D-Lib Magazine, Jan. 1999, vol. 5, Issue 1, 17 pages.

Iko, et al. "User Behavior Analysis of Location Aware Search Engine", 3rd International Conference on Mobile Data Management (MDM'02), Singapore, Jan. 2002.

International Search Report and Written Opinion, PCT Application No. PCT/US2007/076909, Applicant: Microsoft Corporation, Date of Mailing: Jan. 31, 2008, 10 pages.

International Search Report and Written Opinion; International Patent Application No. PCT/US2007/005393; Filed Feb. 27, 2007; Applicant: Microsoft Corporation; Mailed on Aug. 29, 2007; 9 pages.

Jones, Matt et al., "Using a Mobile Device to Vary the Pace of Search," Human-Computer Interaction with Mobile Devices and Services, Mobile HCI 2003, Udine, Italy, 2003, © Springer-Verlag Berlin Heidelberg 2003, pp. 390-394.

Kaasinen, Eija, "User needs for location-aware mobile services," Pers Ubiquit Comput, 2003, vol. 7, © Springer-Verlag London Limited 2003, pp. 70-79.

Kosala, Raymond and Hendrik Blockeel, "Web Mining Research: A Survey," SIGKDD Explorations, Jul. 2000, vol. 2, Issue 1, © 2000 ACM SIGKDD, pp. 1-15.

Larson, Ray R., "Geographic Information Retrieval and Spatial Browsing," In GIS and Libraries: Patrons, Maps and Spatial Information, Linda Smith and Myke Gluck, Eds., University of Illinois, 1996, pp. 81-124, available online at http://sherlock.berkeley.edu/geo_ir/PART1.html.

Lee, Fiona et al., "Global Atlas: Calibrating and Indexing Documents from the Internet in the Cartographic Paradigm," 1st International Conference on Web Information Systems Engineering, IEEE Computer Society 2000, Hong Kong, China, © 2000 IEEE, pp. 125-132.

Lee, R. et al., "Optimization of Geographic Area to a Web Page for Two-Dimensional Range Query Processing," 4th International Conference on Web Information Systems Engineering Workshops, Roma, Italy, 2003, © 2004 IEEE, pp. 9-17.

Leutenegger, Scott T. et al., "STR: A Simple and Efficient Algorithm for R-Tree Packing," 13th International Conference on Data Engineering, IEEE Computer Society 1997, Birmingham U.K., pp. 497-506.

Ma, Qiang and Katsumi Tanaka, "Retrieving Regional Information from Web by Contents Localness and User Location," AIRS 2004, LNCS 3411, 2005, © Springer-Verlag Berlin Heidelberg 2005, pp. 301-312.

Ma, Qiang et al., "A Localness-Filter for Searched Web Pages," APWeb 2003, LNCS 2642, © Springer-Verlag Berlin Heidelberg 2003, pp. 525-536.

Markowetz, Alexander et al., "Design and Implementation of a Geographic Search Engine," 8th International Workshop on the Web and Databases, Jun. 2005, Baltimore, Maryland, 6 pages.

McCurley, Kevin S., "Geospatial Mapping and Navigation of the Web," WWW10, May 2001, Hong Kong, ACM, pp. 221-229.

Platt, John C., "Fast Training of Support Vector Machines using Sequential Minimal Optimization," Chapter 12, Advances in Kernel Methods—Support Vector Learning, B. Schölkopf, C. Burges, and A. Smola, eds., MIT Press, 1999, pp. 185-208.

Pramudiono, Iko et al., "User Behavior Analysis of Location Aware Search Engine," 3rd International Conference on Mobile Data Management, Singapore, Jan. 2002, 7 pages.

Sanderson, Mark and Janet Kohler, "Analyzing geographic queries," In Proceedings of SIGIR 2004, Workshop on Geographic Information Retrieval, ACM Press, Sheffield, UK, 2004, 2 pages.

Song, R.H., Liu, H. F., Wen, J.R., and Ma, W.Y., "Learning Block Importance Models for web pages," In Proceedings of the Tenth International World Wide Web Conference (WWW13), New York, May 2004.

Sterling, Greg, "Search Engine Watch—Local Search: The Hybrid Future," Jan. 8, 2004, http://searchenginewatch.com/searchday/article.php/3296721, (last accessed Feb. 23, 2007).

Sullivan, D. Local Search Part 1-5. http://searchenginewatch.com/searchday/article.php/30913.

Theodoridis, Yannis et al., "Efficient Cost Models for Spatial Queries Using R-Trees," IEEE Transactions on Knowledge and Data Engineering, vol. 12, No. 1, Jan./Feb. 2000, © 2000 IEEE, pp. 19-32.

Vaid, Subodh and Christopher B. Jones, "Spatially Indexing Text Documents," Report on Spatial Indexing Methods, Technical Report D12 2201, SPIRIT project, 2004, 37 pages.

Van Rijsbergen. *Information retrieval*. Butterworths, London, second edition, 1979.

Wang, Chuang et al., "Detecting Geographic Locations from Web Resources," GIR'05, Nov. 2005, Bremen, Germany, © 2005 ACM, pp. 17-24.

Wang, Chuang et al., "Web Resource Geographic Location Classification and Detection," WWW 2005, May 2005, Chiba, Japan, ACM, pp. 1138-1139.

Wang, et al. "Application-driven Web Resource Location Detection", *Thirteenth Conference on Information and Knowledge Management (CIKM 2004)* on May 25, 2004. 9 pages.

Wang, Lee et al., "Detecting Dominant Locations from Search Queries," SIGIR'05, Aug. 2005, Salvador, Brazil, © 2005 ACM, 8 pages.

Yang, Yiming et al., "A Study of Approaches to Hypertext Categorization," Journal of Intelligent Information Systems, © Kluwer Academic Publishers, Boston, pp. 1-25.

Yokoji, Seiji et al., "Kokono Search: A Location Based Search Engine," WWW 10, Hong Kong, May 2001, 2 pages.

\* cited by examiner

METHOD AND SYSTEM FOR WEB RESOURCE LOCATION CLASSIFICATION AND DETECTION

CROSS REFERENCE TO RELATED APPLICATION

The present application is a Divisional of U.S. patent application Ser. No. 11/081,014, now U.S. Pat. No. 7,574,530, filed Mar. 10, 2005, and entitled "METHOD AND SYSTEM FOR WEB RESOURCE LOCATION CLASSIFICATION AND DETECTION," which is incorporated herein in its entirety by reference.

TECHNICAL FIELD

The described technology relates generally to identifying a location associated with a web resource such as a web page.

BACKGROUND

Web resources such as web pages have geographic locations associated with them, which can be categorized as having a local or global geographic scope. For example, a web page that lists houses for sale within a certain region has a local geographic scope. In contrast, a web page with general information, such as an introduction to mathematics, is likely of interest to users from any location and thus has a global geographic scope.

Many location-based web applications have been developed to support mobile devices and local searching needs. Such location-based web applications include navigation systems, location-based search systems, local advertisement systems, geographic retrieval systems, and so on. These web applications typically need to detect a geographic location of a web resource and match it with the user's current location. For example, a cellular phone user may want to find a restaurant that is near the user's current location. A web application could match the user's current location as indicated by the cellular phone with the location of restaurants to identify which restaurants may be nearby.

Typically, web applications search web resources for location information (e.g., city names) and use that information when determining whether the web resource matches the user's location. A difficulty with such web applications is that location information of a web resource may have different purposes and thus different meanings. For example, a web page for a Chinese restaurant may contain the geographic locations "Peking" and "Redmond." The geographic location of Peking indicates that the subject of the web page is somehow related to China, but the geographic location of Redmond indicates that the restaurant is located in Redmond, Wash., USA. If a web application is trying to match the user's current location, which may be in Beijing, to the location of the web page, the web application might erroneously report to the user the web page for the Chinese restaurant because it contains "Peking," which is a geographic location related to Beijing.

It would be desirable to have a technique that would differentiate geographic locations associated with web resources so that web applications could use the geographic locations that are appropriate for their intended purpose.

SUMMARY

A method and system for identifying locations associated with a web resource is provided. The location system identifies three different types of geographic locations: a provider location, a content location, and a serving location. A provider location identifies the geographic location of the entity that provides the web resource. The location system identifies the provider location by identifying potential provider locations and then using a classifier to classify a potential provider location as being or not being a provider location. The location system may initially train the classifier by generating training data that includes potential provider locations, associated features of the web resource as feature vectors, and classifications. A content location identifies the geographic location that is the subject of the web resource. The location system identifies the content location using a geographic hierarchy of locations, assigning weights to each location indicating whether the location is likely the subject of the web resource, and calculating a power (e.g., relatedness) and spread (e.g., uniformity of relatedness) for each location. After the power and spread for each location are calculated, the location system then identifies those locations whose power meets a threshold power and whose spread meets a threshold spread as content locations. A serving location identifies the geographic scope that the web page reaches. The location system identifies the serving location using a power and spread calculation as described above. The location system, however, factors in serving locations of those web resources that include links to the target web resource and locations of those users who access the web resources based on analysis of web access logs. An application can select to use the type of location that is of particular interest.

DETAILED DESCRIPTION

Figure 1:
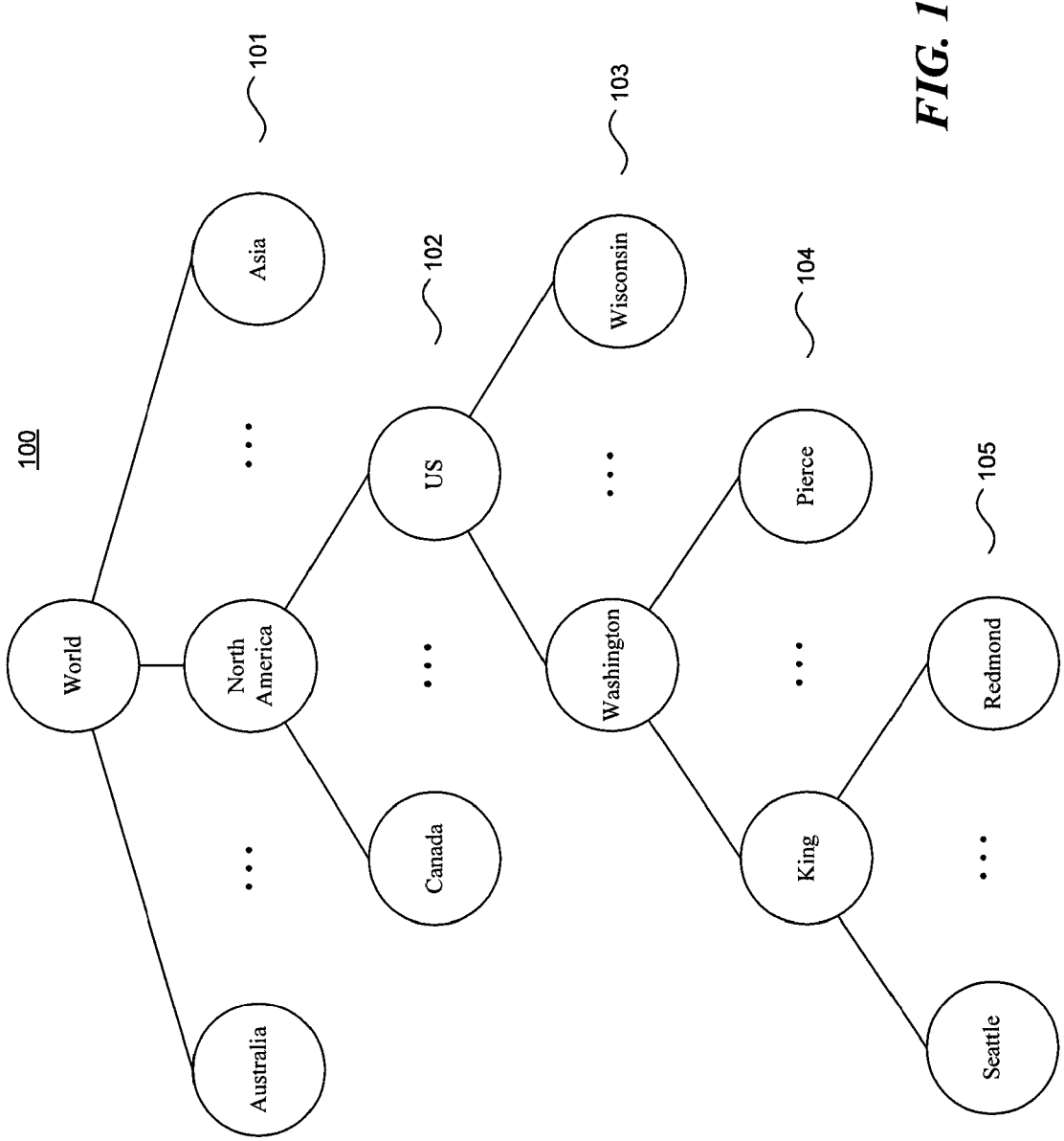
FIG. 1 is a diagram that illustrates a geographic hierarchy in one embodiment.

A method and system for identifying locations associated with a web resource is provided. In one embodiment, the location system identifies three different types of geographic locations: a provider location, a content location, and a serving location. A provider location identifies the geographic location of the entity (e.g., organization, corporation, or person) that provides the web resource. The provider location usually is a sequential address string including street address, city name, state name, zip code, country, and so on. For example, the provider location of a web site provided by a certain company may be the address of the corporate headquarters of the company. A content location identifies the geographic location that is the subject of the web resource. For example, a web page about the Great Wall of China would have "China" as a content location because the subject of the web page is about China. A serving location identifies the geographic scope that the web page reaches. For example, a web page about houses for sale in Redmond, Wash. may have a geographic scope of King County, Wash. because the vast majority of the users who access that web page may be located in King County. The identification of the different types of locations may be used in various applications. For example, the provider location may be used by services such as map services, yellow page services, navigation services, shopping services, address management services, real estate services, and so on. The content location may be used by services such as location-based search services, web-based classified services, geographic information navigation and retrieval services, and so on. The serving location may be used by services such as local advertising services, marketing services, personalization services, and so on. In this way, an application can select to use the type of location that is of particular interest.

In one embodiment, the location system identifies the provider location by identifying potential provider locations and then using a classifier to classify a potential provider location as being or not being a provider location. The location system may initially train a classifier by generating training data that includes potential provider locations, associated features of the web resource as a feature vector, and a classification. The training data may be derived from a corpus of web resources. For example, the location system may extract strings from a web resource that are potentially provider locations. For example, the location system may look for street addresses, city names, state names, zip codes, and countries within the web resource. The location system then extracts features of the web resource that may indicate whether or not the extracted string is a provider location. The extracted features may include URL, title, anchor text, page content, referred frequency, level of web page within a web site, and spatial position of the extracted string on a web page. Some terms (e.g., "about us" and "contact us") in a title, URL, or anchor text can be a hint that the web page contains provider location. The referred frequency indicates the number of times that a location is referenced within a web site. Since the address of a provider is typically provided on multiple web pages of a web site, a high referred frequency may tend to indicate that the extracted string is a provider location. Also, since provider locations are typically provided on the first level or second level web pages of a web site, the level of the web page from which the location string is extracted may indicate whether the extracted location string is a provider location. Since provider locations are often placed in footers of a web page, location of an location string within a web page may be used to help identify whether the location string is a provider location.

In one embodiment, the location system identifies the content location using a geographic hierarchy of locations, assigning weights to each location indicating whether the location is likely the subject of the web resource, and calculating a power and spread for each location. After the power and spread for each location are calculated, the location system then identifies those locations whose power meets a threshold power and whose spread meet a threshold spread as content locations. The power is a measure of the relatedness of a location to the web resource, and the spread is a measure of the uniformity of the power among sibling locations of the geographic hierarchy. For example, if a web resource mentions each of Redmond, Seattle, Bellevue, Spokane, and Tacoma the same number of times, then the content location may be more appropriately identified as their common ancestor—Washington State, rather than the cities individually because of the large power value of Washington State. In contrast, the location system does not identify any ancestor locations of Washington State (e.g., U.S.) because the ancestors' spread values are too small because cities in other states are not mentioned in the web resource. The location system may represent power by the following equation:

$$\text{Power}(w, l) = Wt(w, l) + \sum_{j=1}^{n} Wt(w, \text{Child}_j(l)) + \sum_{i=1}^{m} \frac{Wt(w, \text{Ancestor}_i(l))}{|\text{Sibling}_i(l)|} \quad (1)$$

where Power(w,l) is the power of web resource w at location l in the geographic hierarchy, Wt(w,l) is the weight of location l for web resource w, $\text{Child}_j(l)$ is a descendant location l, n is the number of all descendant locations of location l, $\text{Ancestor}_i(l)$ is an ancestor location of location l, m is the number of all ancestor locations of location l, and $|\text{Sibling}_i(l)|$ is the number of locations at the same level with location l within the subtree with $\text{Ancestor}_i(l)$ as the root. This equation for power considers weights of both ancestor and descendant locations in addition to the weight of the current location. The location system may traverse the location hierarchy in a bottom-up manner to sum the weights of the descendant locations. The location system may also traverse the location hierarchy in a top-down manner to sum the weights of the ancestor locations. In this equation, the power of a location includes the power of the ancestor locations equally divided among sibling locations. One skilled in the art will appreciate that more complex strategies could be used to distribute the power of ancestor locations that would consider the geographic area or population density of the sibling locations.

In one embodiment, the location system when identifying the content location calculates the weight of the locations based on geographic keywords that are extracted from the web resource. For example, the geographic keywords may include geographic names (e.g., Redmond), postal codes (e.g., 98052), telephone numbers (e.g., 425-555-5555), and so on. The location system may assign a higher weight to postal codes and telephone numbers because they may be a more accurate indicator of content location than a geographic name. For example, some geographic names may ambiguously refer to different geographic locations; for example, "Washington" may refer to Washington State or Washington, D.C. Also some geographic names may ambiguously refer to geographic locations and persons; for example, "Washington" may refer to George Washington or Washington State. The location system may define the weight of the location by the following equation:

$$Wt(gk) = \begin{cases} WT(zt) & \text{when } gk \text{ is Zip or telephone number} \\ (1 - Wt(zt)) \times \left(\frac{ldf(gn)}{idf(gn)}\right) & \text{when } gk \text{ is geographic name} \end{cases} \quad (2)$$

where $Wt(gk)$ represents the weights of the geographic keyword $gk$, $Wt(zt)$ represents the common weight of zip code and telephone number, $ldf(gn)$ is the document frequency of each geographic name (gn) as a geographic keyword, and $idf(gn)$ is the document frequency of gn as a general keyword. Due to the high reliability of zip codes and telephone numbers in correctly identifying unique geographic locations, the location system does not distinguish them and uses the same constant $Wt(zt)$ (e.g., being greater than zero but less than one) to represent their common weight. The location system assigns weights of all geographic names subject to a common factor $(1-Wt(zt))$. The location system uses $Wt(zt)$ to control the balance of weights between zip codes/telephone numbers and geographic names. The weight of each individual geographic name is adjusted by $ldf(gn)/idf(gn)$. The value for $ldf(gn)$ and $idf(gn)$ are calculated from two corpuses. One is a geographic relevant document corpus, where the location system assumes that each reference of gn is from a geographic perspective and $ldf(gn)$ represents the referred frequency of each geographic name. The other is a general document corpus that is used to compute $idf(gn)$. The underlying reasoning of weighting each geographic name by the ratio of $ldf(gn)$ to $idf(gn)$ comes from the observation that a geographic name will be more likely to be truly about a geographic location if it is more frequently referred in the geographic corpus than in the general corpus.

After the weight for each geographic keyword is calculated, the location system then calculates the weight of each location by summing up the weights of the geographic keywords that are aliases for that location. For example, the geographic location of Redmond may have aliases of the geographic name of Redmond, zip code of 98052, and area code of 425. The location system represents the weight of a location by the following equation:

$$Wt(w, l) = \sum_{gk} rf(w, gk) \times Wt(gk) \quad (3)$$

where $Wt(w,l)$ represents the weight of location l for web resource w, gk (i.e., geographic keyword) represents any possible representations or aliases of location l, $rf(w, gk)$ represents the referred frequency of gk in web resource w, and $Wt(gk)$ is the weight of gk.

In one embodiment, the location system defines the spread of a location by the following equation:

$$Spread(w, l) = \frac{-\sum_{i=1}^{n} \frac{Power(w, l_i)}{\sum_{j=1}^{n} Power(w, l_j)} \times \log\left(\frac{Power(w, l_i)}{\sum_{j=1}^{n} Power(w, l_j)}\right)}{\log n} \quad (4)$$

where $Spread(w,l)$ is the spread for location l of web resource w, location $l_i$ or location $l_j$ is a direct descendant location of location l, and n is the number of all direct descendants of l. After the Power and Spread are calculated for the locations, the location system identifies the content locations by traversing the geographic hierarchy in a top-down manner starting with the root location. The location system prunes any subtree when the Spread or Power ratio (i.e., power(location)/power (parent location)) of its root location does not exceed a given threshold Ts or Tp, respectively. When the traversal completes, the locations remaining in the geographic hierarchy represent the content location.

In one embodiment, the location system identifies the serving location of a target web resource using a power and spread calculation as described above. The location system, however, factors in serving locations of those web resources that include links to the target web resource. The location system assumes that web resources that reach a certain serving location are more likely referenced by other web resources that reach the same serving location. The location system may identify the serving locations of multiple web resources in parallel. The location system represents the weight of each location for a web resource by the following equation:

$$Wt(w, l) = \begin{cases} \alpha_1 UserFreq(w, l) + (1 - \alpha_1) ContentLoc(w, l) & i = 0 \\ \alpha_2 \sum_{j=1}^{n} SrvLoc_{i-1}(w_j, l) + (1 - \alpha_2) SrvLoc_{i-1}(w, l) & i > 0 \end{cases} \quad (5)$$

where $Wt(w,l)$ represents the weight of location l for web resource w, $UserFreq(w,l)$ represents web resource w's access frequency by all users within location l, $ContentLoc(w,l)$ is 0 or 1 indicating whether l is contained in the content location of w, $w_j$ is a web resource that has a link to web resource w, n is the number of all the web resources that have links to w, $SrvLoc_{i-1}(w_j,l)$ represents whether l is hierarchically contained in the intermediate serving location of web resource w after the (i−1)th iteration, and $\alpha_1$ and $\alpha_2$ are the weights of user access frequency and the serving location of other locations, respectively.

To calculate the serving location for all the web pages of a web site, the location system first calculates the content location for each web page. The location system also collects the location of users who access the various web pages of the web site (e.g., by accessing web log files). The location system then initializes the weights using Equation 5 with i=0. The location system then calculates the power and spread of each location and identifies the serving locations in the same manner as described above for the content locations. This completes the first iteration. The location system then calculates the weights for each location using Equation 5 with i>0. The location system calculates the power and spread of each location and identifies the serving locations as described above. The location system repeats this process until the solution converges on the final serving locations.

FIG. 1 is a diagram that illustrates a geographic hierarchy in one embodiment. The geographic hierarchy 100 includes a continent level 101, a country level 102, a state level 103, a county level 104, and a city level 105. One skilled in the art would appreciate that many different types of levels may be used; for example, a country may be divided into regions such as North, South, East, and West. In this example, Washington State has ancestor locations of North America and United States and has the descendant locations of King and Pierce counties and Seattle and Redmond cities. King and Pierce counties are direct descendants of Washington State and are sibling locations.

Figure 2:
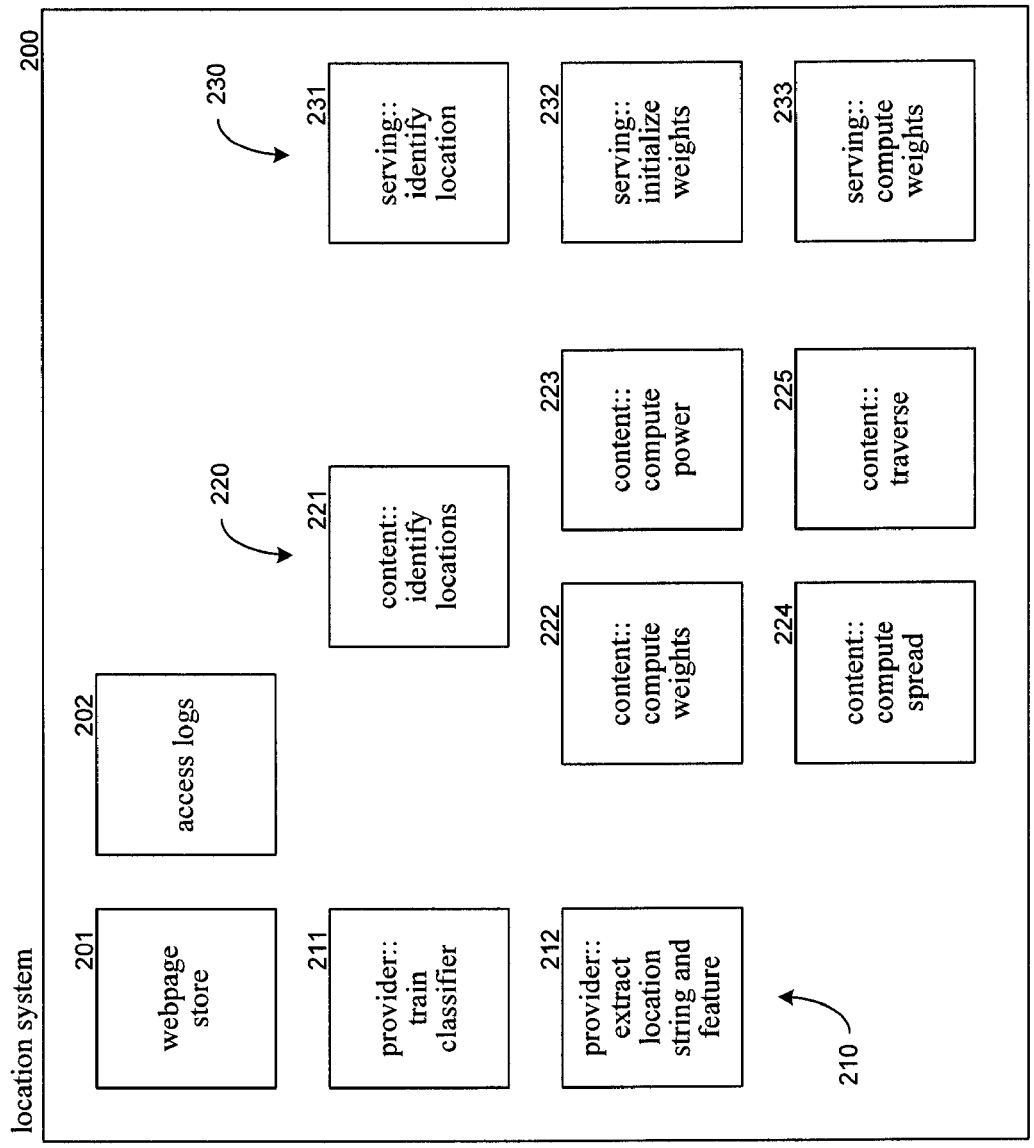
FIG. 2 is a block diagram that illustrates components of the location system in one embodiment.

FIG. 2 is a block diagram that illustrates components of the location system in one embodiment. The location system 200 includes a web page store 201, an access store 202, provider location components 210, content location components 220, and serving location components 230. The provider location components include a train classifier component 211 and an extract location string and feature component 212. The train classifier component is responsible for training a classifier such as a support vector machine. The train classifier component invokes the extract location string and feature component to identify location strings and feature vectors of the web pages of the web page store. The train classifier component then inputs the classifications for the extracted location strings. The train classifier component then trains the classifier using the extracted location strings and feature vectors and their classifications. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to, but not identical to, the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.) After the classifier is trained, the extract location string and feature component can be used to extract the location strings and the feature vectors for the web pages of a target web site. The classifier can then be used to classify the extracted location strings as being or not being a provider location.

The content location components include an identify locations component 221, a compute weights component 222, a compute power component 223, a compute spread component 224, and a traverse component 225. The identify locations component identifies the content locations associated with a target web page. The identify locations component invokes the compute weights component to compute the weights for the locations of the geographic hierarchy based on the content of the target web page. The identify locations component then invokes the compute power component and the compute spread component to compute the power and spread for each location of the geographic hierarchy. The identify locations component then invokes the traverse component to traverse the geographic hierarchy in a top-down manner. The traverse component prunes subtrees of the geographic hierarchy when the power ratio and spread of the root location of the subtree do not meet a threshold. The remaining locations in the geographic hierarchy represent the content locations of the target web page.

The serving location components include an identify locations component 231, an initialize weights component 232, and a compute weights component 233. The identify locations component identifies the serving locations associated with the web pages of a web site. The identify locations component invokes the initialize weights component to initialize the weights of the geographic hierarchy for a target web page. The initialize weights component initializes the weights based on the content locations of the target web page and the geographic locations of the users who access the target web page. The identify locations component then calculates the power and spread of each location of the geographic hierarchy using the compute power and compute spread components of the content location components. The identify locations component then identifies the serving locations by invoking the traverse component of the content location components. The remaining locations of the geographic hierarchy represent the serving locations of the first iteration of the identify locations component. The identify locations component then starts the second iteration by setting the weights of the geographic locations based on the remaining serving locations for the target web page and the remaining serving locations of the web pages that have links to the target web page of the previous iterations. Thus, the identify locations component identifies the serving locations of multiple web pages of one or more web sites in parallel. The identify locations component then invokes the compute power, compute spread, and traverse components to identify the serving locations for the second iteration. The identify locations component continues to perform the iterations until the serving locations converge on a solution.

The computing device on which the location system is implemented may include a central processing unit, memory, input devices (e.g., keyboard and pointing devices), output devices (e.g., display devices), and storage devices (e.g., disk drives). The memory and storage devices are computer-readable media that may contain instructions that implement the location system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the location system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The location system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
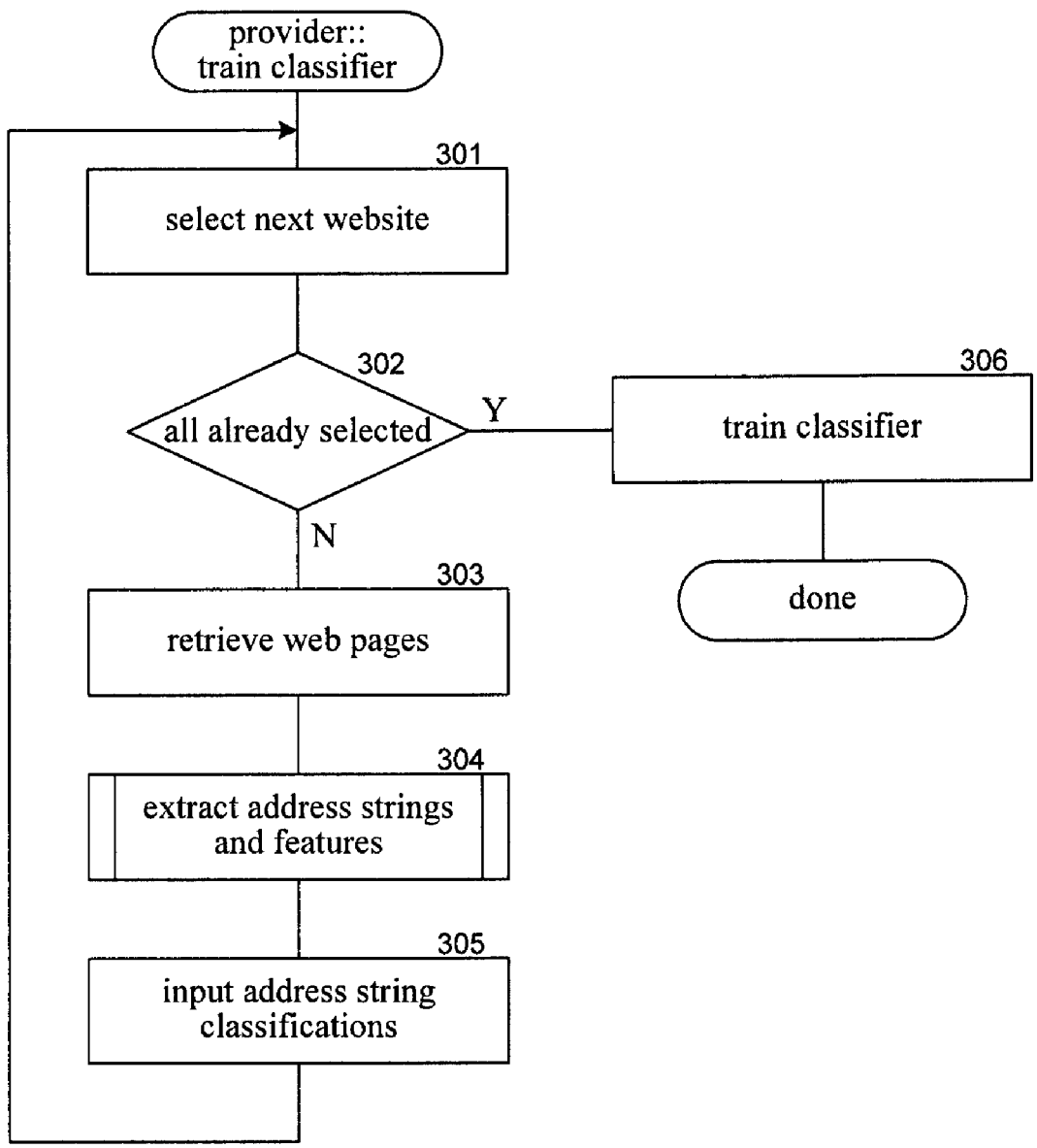
FIG. 3 is a flow diagram that illustrates the processing of the train classifier component of the provider location components in one embodiment.
Figure 4:
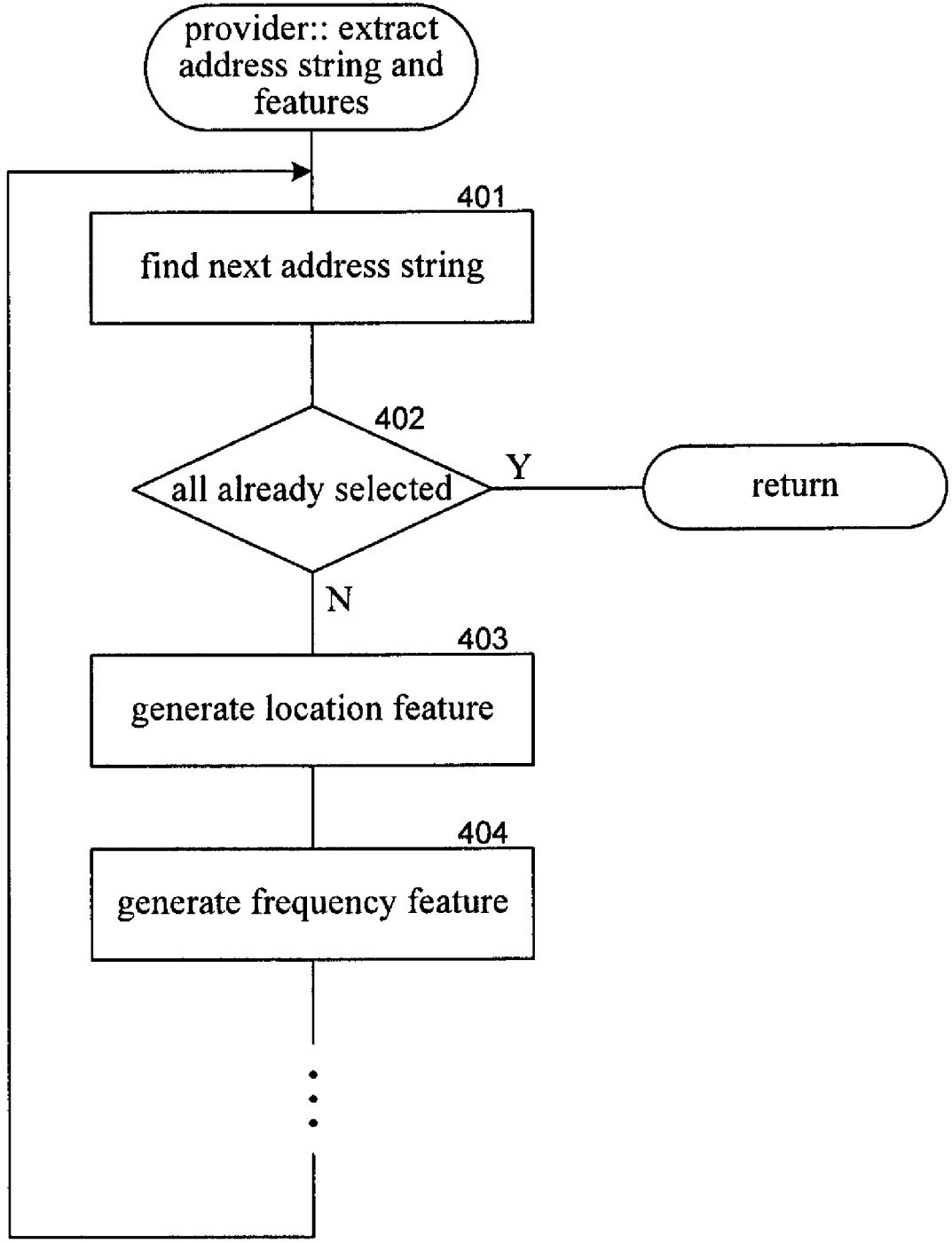
FIG. 4 is a flow diagram that illustrates the processing of the extract location string and feature component of the provider location components in one embodiment.

FIGS. 3-4 are flow diagrams that illustrate the processing of components of the provider location components of the location system in one embodiment. FIG. 3 is a flow diagram that illustrates the processing of the train classifier component of the provider location components in one embodiment. The component loops extracting provider location strings and feature vectors for the web pages of the web sites of the web page store. The component then trains the classifier. In block 301, the component selects the next web site of the web page store. In decision block 302, if all the web sites have already been selected, then the component continues at block 306, else the component continues at block 303. In block 303, the component retrieves the web pages of the selected web site. In block 304, the component extracts the location strings and feature vectors for the selected web pages by invoking the extract location strings and features component. In block 305, the component inputs the classifications for the extracted location strings. For example, the component may prompt a user to indicate whether each location string represents a provider location. The component then loops to block 301 to select the next web site of the web page store.

FIG. 4 is a flow diagram that illustrates the processing of the extract location string and feature component of the provider location components in one embodiment. The component loops searching for location strings within the web pages of the selected web site. In block 401, the component finds the next location string within a web page. In decision block 402, if all the location strings have already been found, then the component returns, else the component continues at block 403. In blocks 403-404, the component generates the feature vector corresponding to the found location string and then loops to block 401 to select the next location string. As described above, the feature vector may include various features of the web pages from which the location string was extracted, such as location of the location string on a web page, hierarchy level of the web page within the web site, frequency of the location string within the web pages, and so on.

Figure 5:
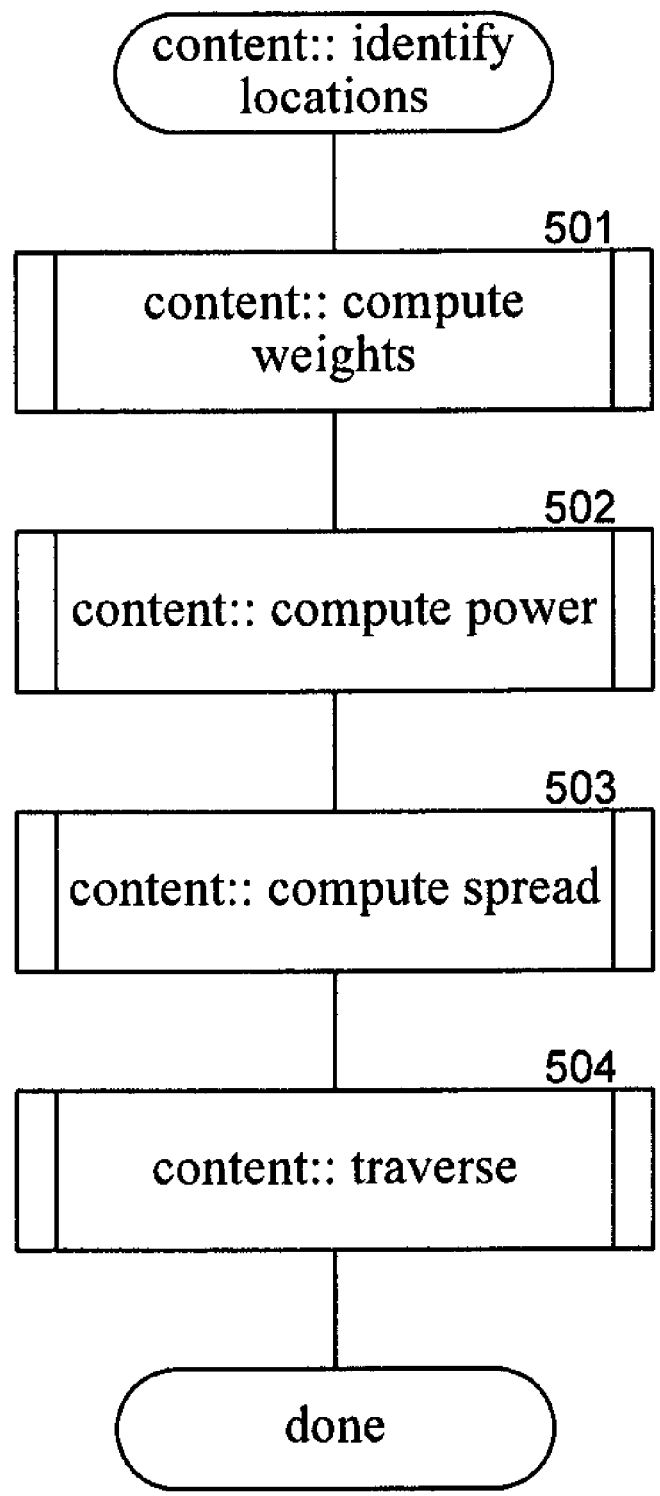
FIG. 5 is a flow diagram that illustrates the processing of the identify locations component of the content location components in one embodiment.

FIGS. 5-12 are flow diagrams that illustrate the processing of components of the content location components in one embodiment. FIG. 5 is a flow diagram that illustrates the processing of the identify locations component of the content location components in one embodiment. The component controls the overall process of identifying the content locations of a target web page. In block 501, the component invokes the compute weights component to compute the weights of the locations within the geographic hierarchy for the target web page. In block 502, the component invokes the compute power component to compute the power for the locations within the geographic hierarchy based on their weights. In block 503, the component invokes the compute spread component to compute the spread for the locations within the geographic hierarchy based on their power. In block 504, the component invokes the traverse component to traverse the geographic hierarchy to identify the content locations for the target web page. The component then completes.

Figure 6:
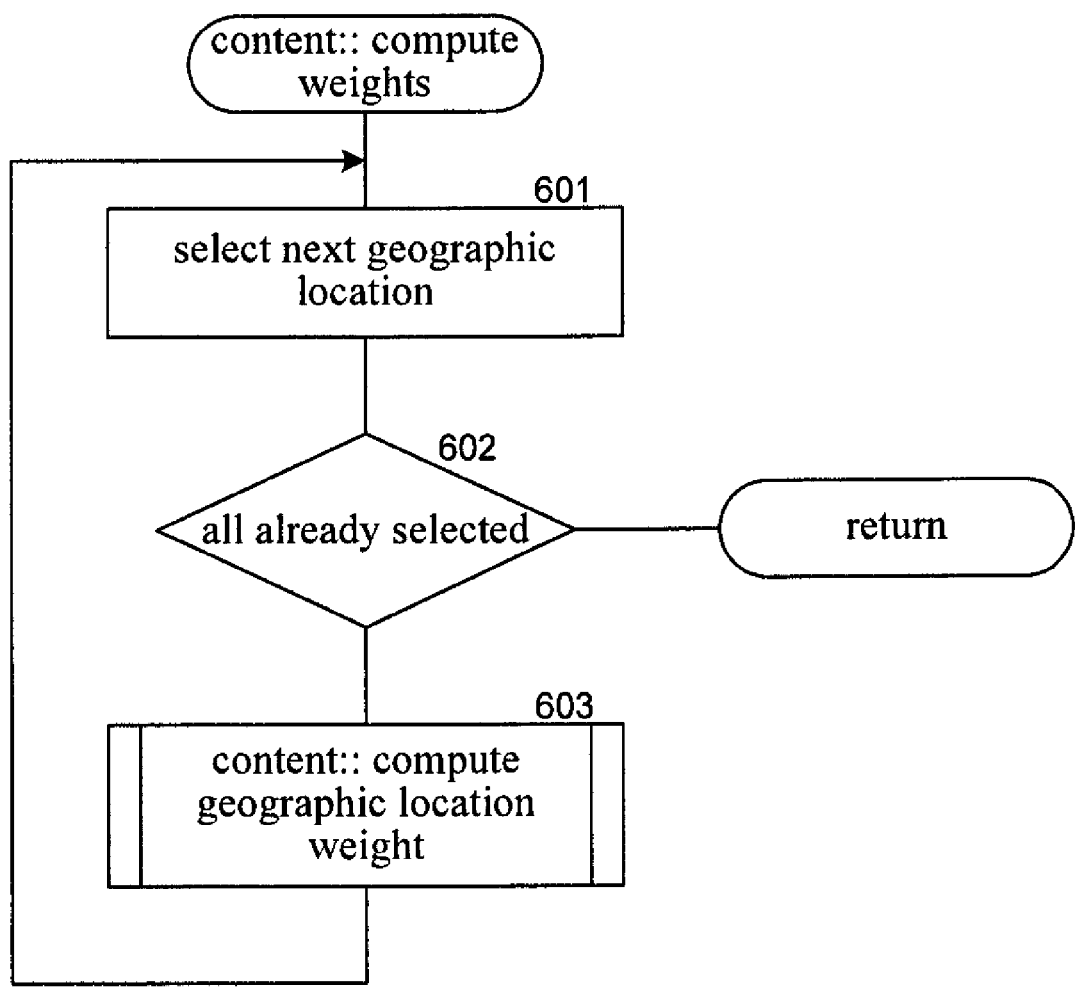
FIG. 6 is a block diagram that illustrates the processing of the compute weights component of the content location components in one embodiment.

FIG. 6 is a block diagram that illustrates the processing of the compute weights component of the content location components in one embodiment. The component loops selecting the geographic locations of the target web page and computing their weights. In block 601, the component selects the next geographic location of the geographic hierarchy. In decision block 602, if all the geographic locations have already been selected, then the component returns, else the component continues at block 603. In block 603, the component invokes the compute geographic location weight component passing the selected geographic location to compute the weight of the geographic location for the target web page. The component then loops to block 601 to select the next geographic location. One skilled in the art will appreciate that the processing of the compute weights component may alternatively identify geographic locations of the target web page first and then compute the weights for the locations of the geographic hierarchy, rather than selecting each location of the geographic hierarchy first. In general, these flow diagrams illustrate the functional processing of the components to facilitate the description of the technology. One skilled in the art will appreciate that these components may be optimized in various ways.

Figure 7:
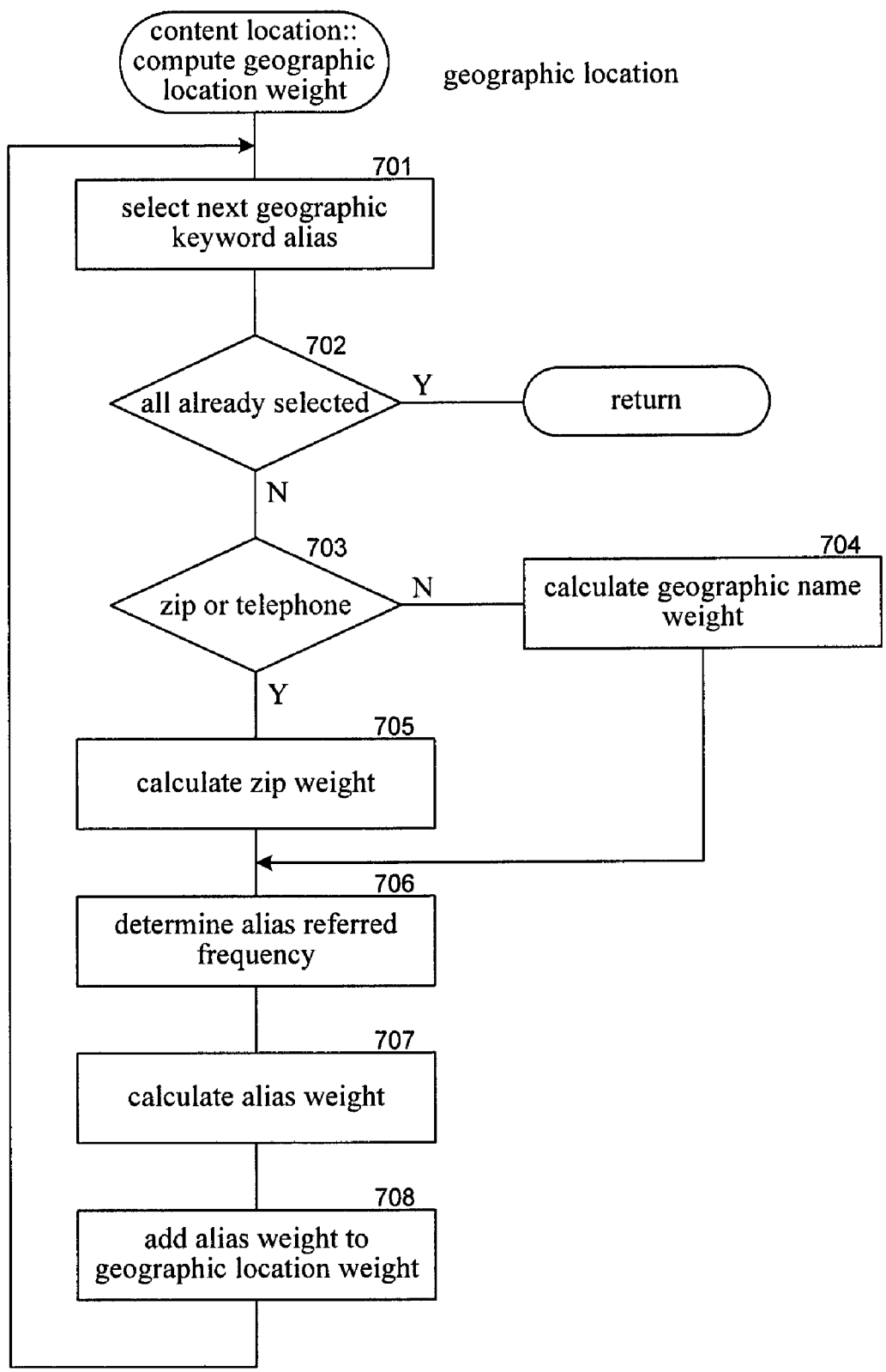
FIG. 7 is a flow diagram that illustrates the processing of the compute geographic location weight component of the content location components in one embodiment.

FIG. 7 is a flow diagram that illustrates the processing of the compute geographic location weight component of the content location components in one embodiment. The component is passed a geographic location and computes the weight of the geographic location for the target web page. The component loops summing the contributions of the aliases for the passed geographic location. In block 701, the component selects the next alias of the passed location on the target web page. In decision block 702, if all the aliases on the target web page have already been selected, then the component returns, else the component continues at block 703. In decision block 703, if the selected alias is a postal code or a telephone number, then the component continues at block 705, else the component continues at block 704. In block 704, the component calculates the weight for the geographic name using Equation 2. In block 705, the component calculates the weight for the postal code or telephone number using Equation 2. In block 706, the component determines the number of times that the selected alias is referred to on the target web page. In block 707, the component calculates the weight contribution of the selected alias using Equation 3. In block 708, the component adds the weight contribution of the selected alias to the weight of the passed geographic location. The component then loops to block 701 to select the next alias.

Figure 8:
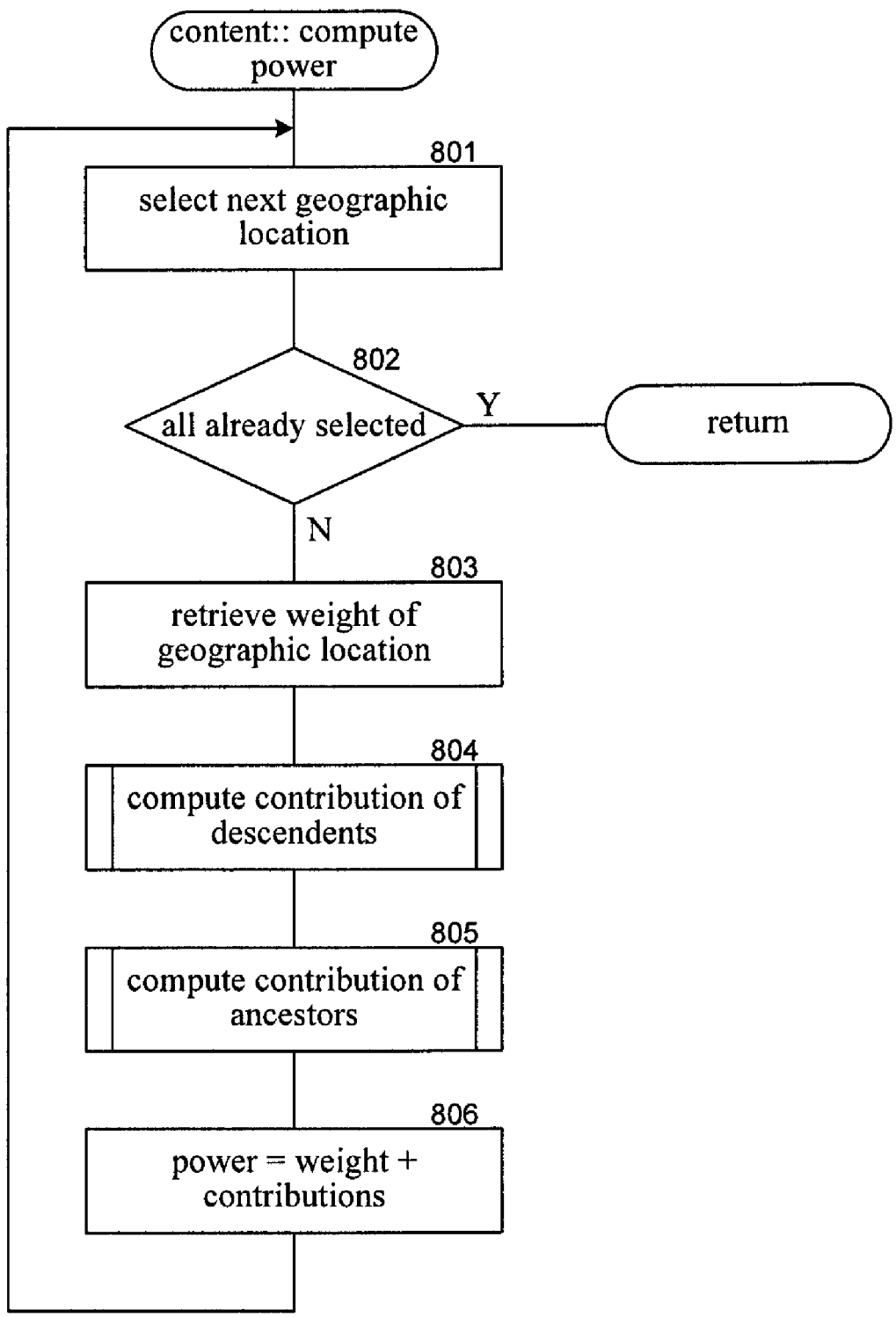
FIG. 8 is a flow diagram that illustrates the processing of the compute power component of the content location components in one embodiment.

FIG. 8 is a flow diagram that illustrates the processing of the compute power component of the content location components in one embodiment. The component loops computing the power for each geographic location of the geographic hierarchy in a bottom-up manner. In block 801, the component selects the next geographic location of the geographic hierarchy. In decision block 802, if all the geographic locations have already been selected, then the component returns, else the component continues at block 803. In block 803, the component retrieves the weight of the selected geographic location. In block 804, the component invokes the compute contribution of descendants component to compute the contribution of the descendants to the power. In block 805, the component invokes the compute contribution of ancestors component to compute the contribution of the ancestors to the power. In block 806, the component calculates the power as a combination of the retrieved weight and the contributions. The component then loops to block 801 to select the next geographic location.

Figure 9:
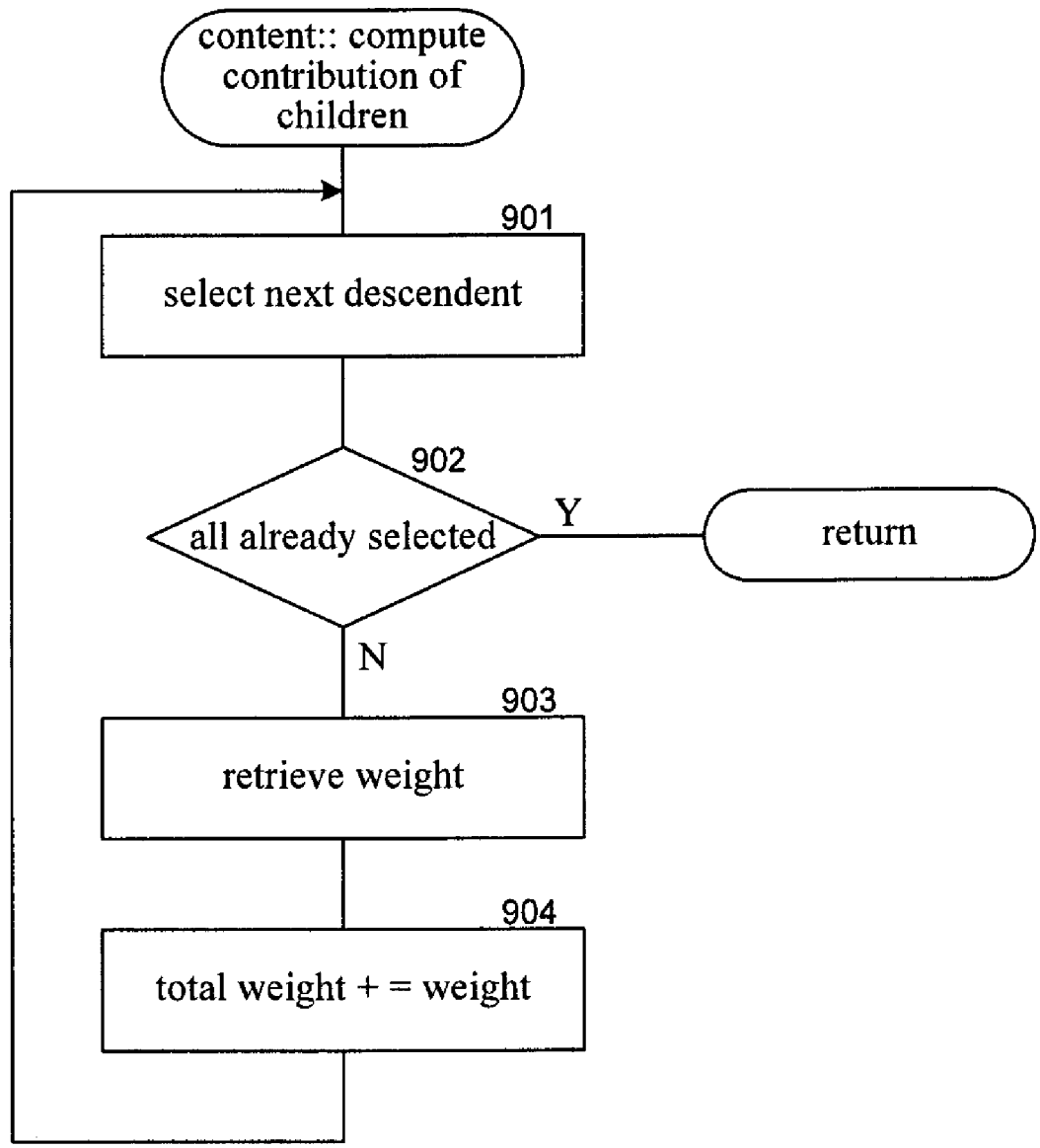
FIG. 9 is a flow diagram that illustrates the processing of the compute contribution of descendants component of the content location components in one embodiment.

FIG. 9 is a flow diagram that illustrates the processing of the compute contribution of descendants component of the content location components in one embodiment. The component loops selecting the descendants of the passed geographic location and calculates the contribution of their weight to the power of the passed geographic location. In block 901, the component selects the next descendant. In decision block 902, if all the descendants have already been selected, then the component returns, else the component continues at block 903. In block 903, the component retrieves the weight for the selected descendant. In block 904, the component adds the retrieved weight to the running total weight for the passed geographic location of the descendants. The component then loops to block 901 to select the next descendant.

Figure 10:
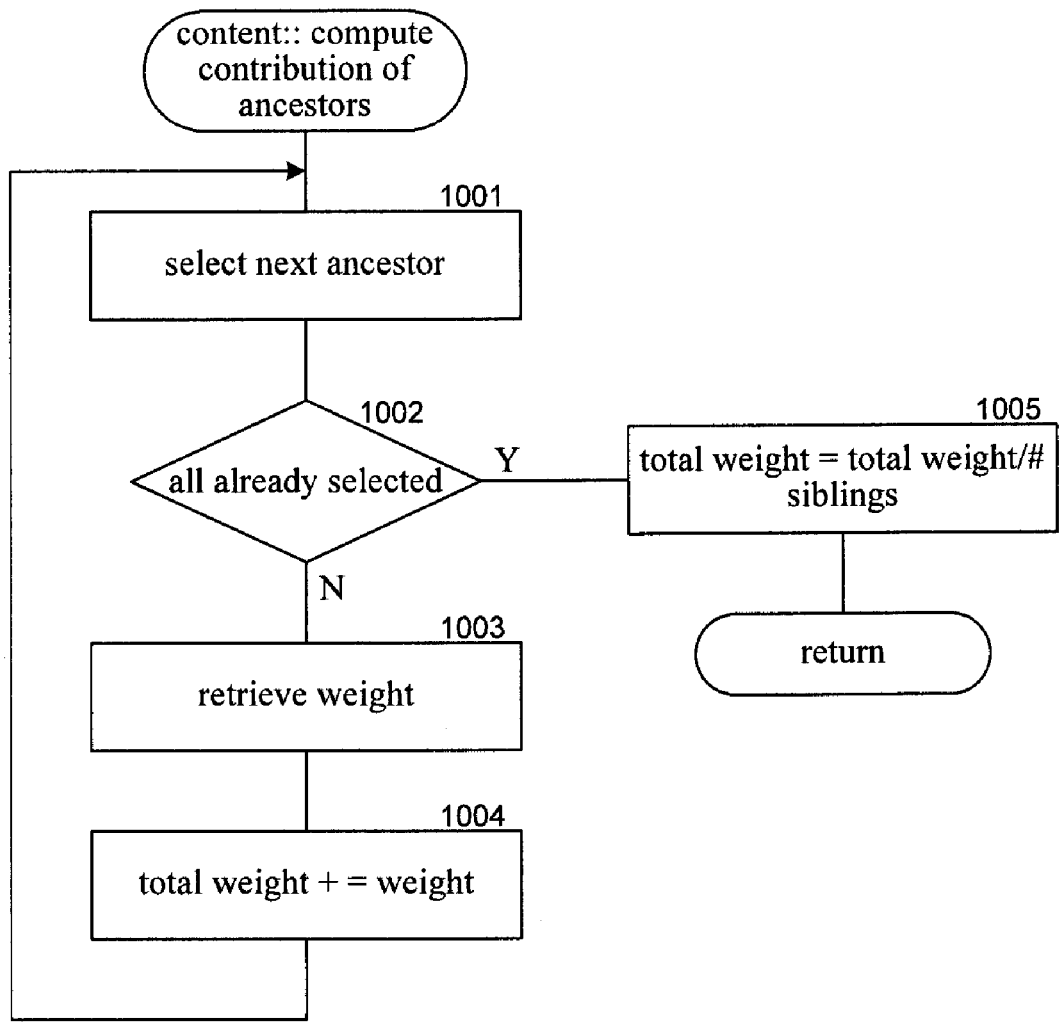
FIG. 10 is a flow diagram that illustrates the processing of the compute contribution of ancestors component of the content location components in one embodiment.

FIG. 10 is a flow diagram that illustrates the processing of the compute contribution of ancestors component of the content location components in one embodiment. The component loops selecting each ancestor location of the passed geographic location and aggregates the contribution of their weights to the power of the passed geographic location. In block 1001, the component selects the next ancestor location of the passed geographic location. In decision block 1002, if all the ancestor locations have already been selected, then the component continues at block 1005, else the component continues at block 1003. In block 1003, the component retrieves the weight of the selected ancestor location. In block 1004, the component adds the retrieved weight to a running total of the weights of the ancestor locations. The component then loops to block 1001 to select the next ancestor location. In block 1005, the component divides the total weight by the number of sibling locations of the passed geographic location and then returns.

Figure 11:
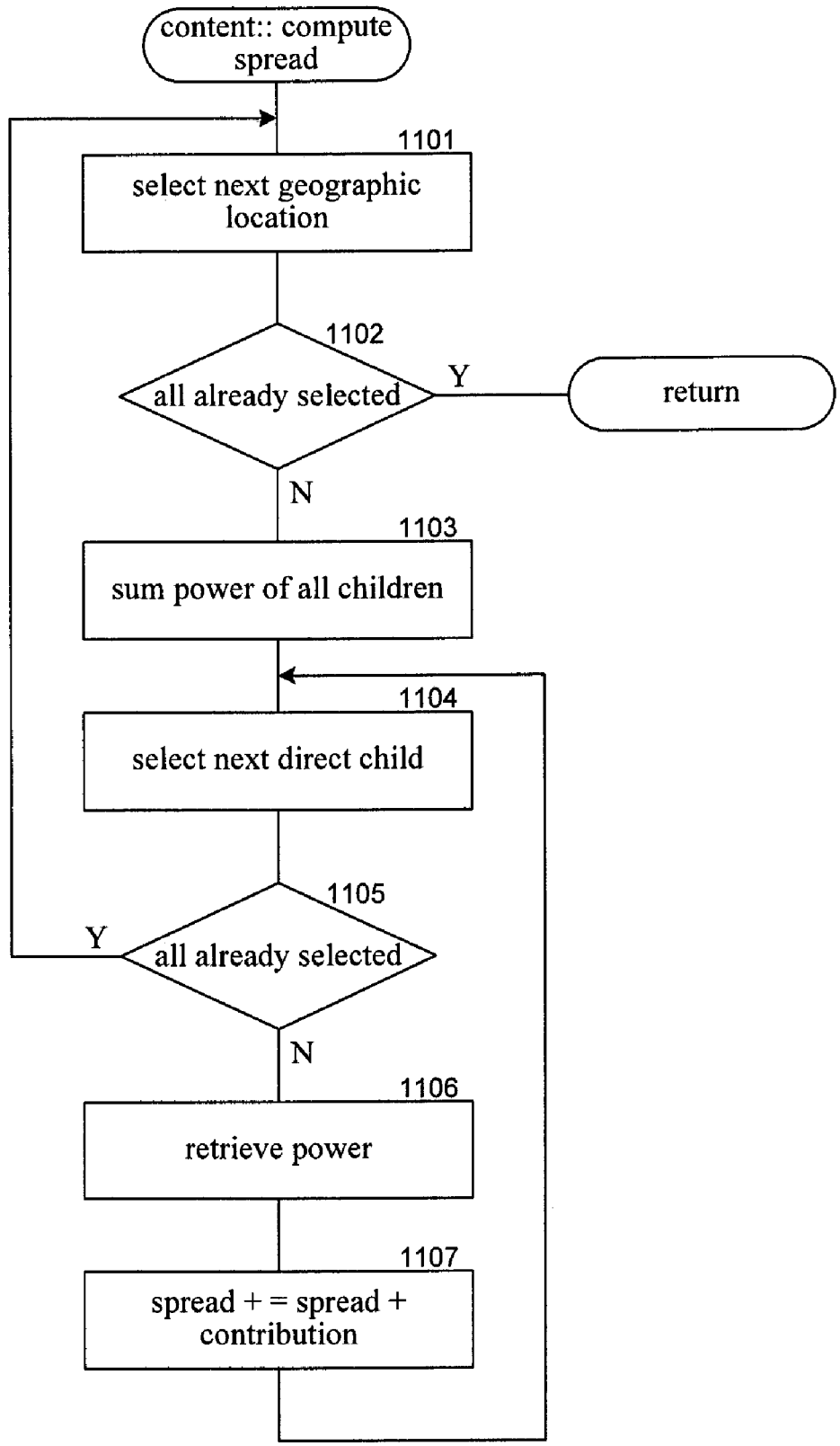
FIG. 11 is a flow diagram that illustrates the processing of the compute spread component of the content location components in one embodiment.

FIG. 11 is a flow diagram that illustrates the processing of the compute spread component of the content location components in one embodiment. The component loops calculating the spread for each geographic location of the geographic hierarchy. In block 1101, the component selects the next geographic location of the geographic hierarchy. In decision block 1102, if all the geographic locations have already been selected, then the component returns, else the component continues at block 1103. In block 1103, the component sums the power of all descendant locations of the selected geographic location. In blocks 1104-1107, the component loops calculating the contribution to the spread of each direct descendant location of the selected geographic location. In block 1104, the component selects the next direct descendant location of the selected geographic location. In decision block 1105, if all the direct descendant locations of the selected geographic location already have been selected, then the component loops to block 1101 to select the next geographic location, else the component continues at block 1106. In block 1106, the component retrieves the power for the selected direct descendant location. In block 1107, the component adds the retrieved power to the spread for the selected geographic location and then loops to block 1104 to select the next direct descendant location of the selected geographic location.

Figure 12:
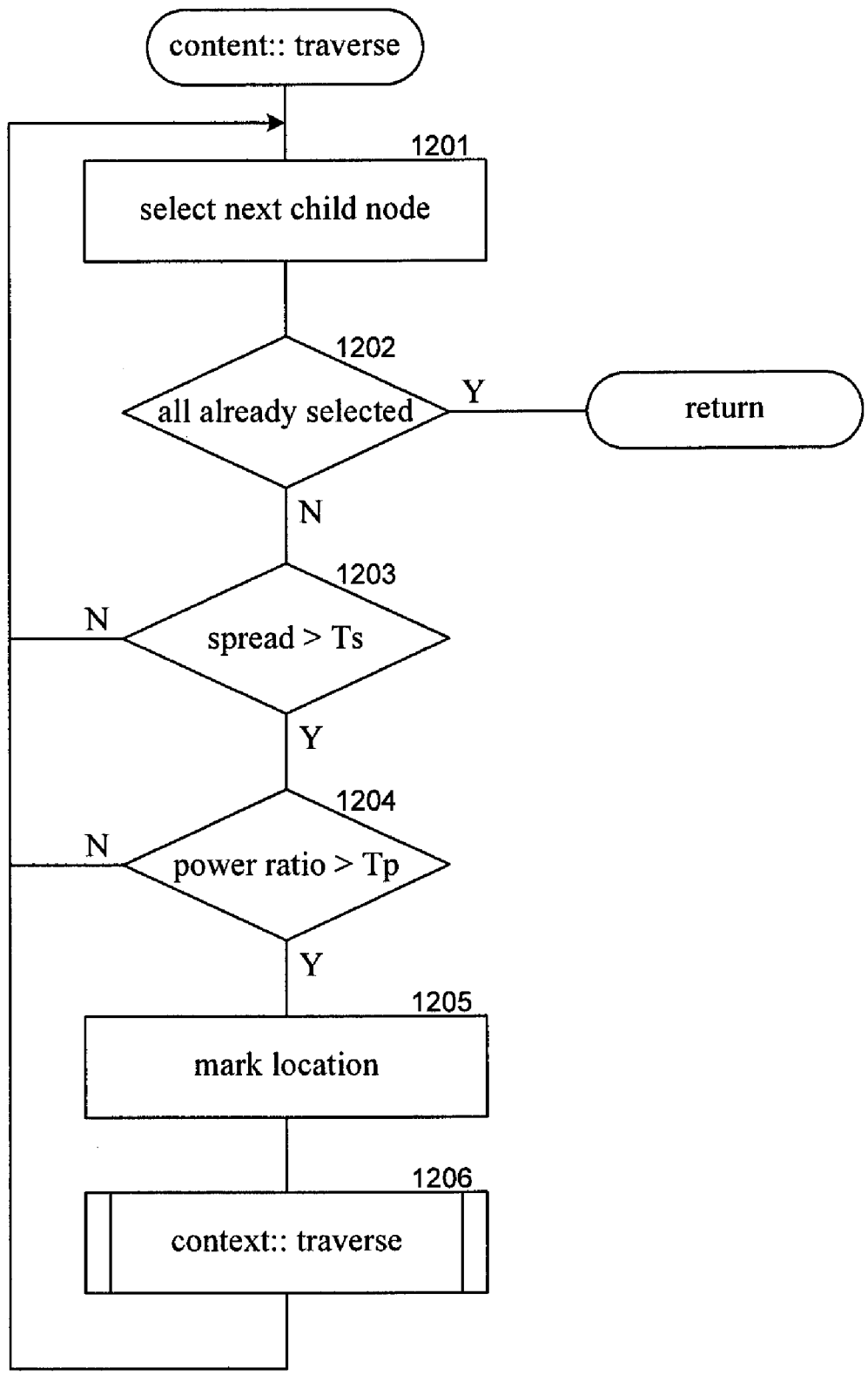
FIG. 12 is a flow diagram that illustrates the processing of the traverse component of the content location components in one embodiment.

FIG. 12 is a flow diagram that illustrates the processing of the traverse component of the content location components in one embodiment. The component is illustrated as a recursive component that traverses the geographic hierarchy in a top-down manner. The component is passed the geographic location that is currently being visited. In blocks 1201-1206, the component loops selecting each direct descendant location of the passed location and either prunes the location or marks its location as being a content location and recursively invokes the traverse component. In block 1201, the component selects the next direct descendant location of the passed location. In decision block 1202, if all the direct descendant locations have already been selected, then the component returns, else the component continues at block 1203. In decision block 1203, if the spread of the selected direct descendant location is greater than a threshold spread, then the component continues at block 1204, else the component prunes the subtree with the selected direct descendant location as its root by looping to block 1201 to select the next direct descendant location of the passed geographic location. In decision block 1204, if the power ratio of the selected direct descendant location is greater than a threshold power ratio, then the component continues at block 1205, else the component prunes the subtree with the selected direct descendant location as its root by looping to block 1201 to select the next direct descendant location of the passed geographic location. In block 1205, the component marks the passed geographic location as being a content location. In block 1206, the component recursively invokes the traverse component passing the selected direct descendant location. The component then loops to block 1201 to select the next direct descendant location.

Figure 13:
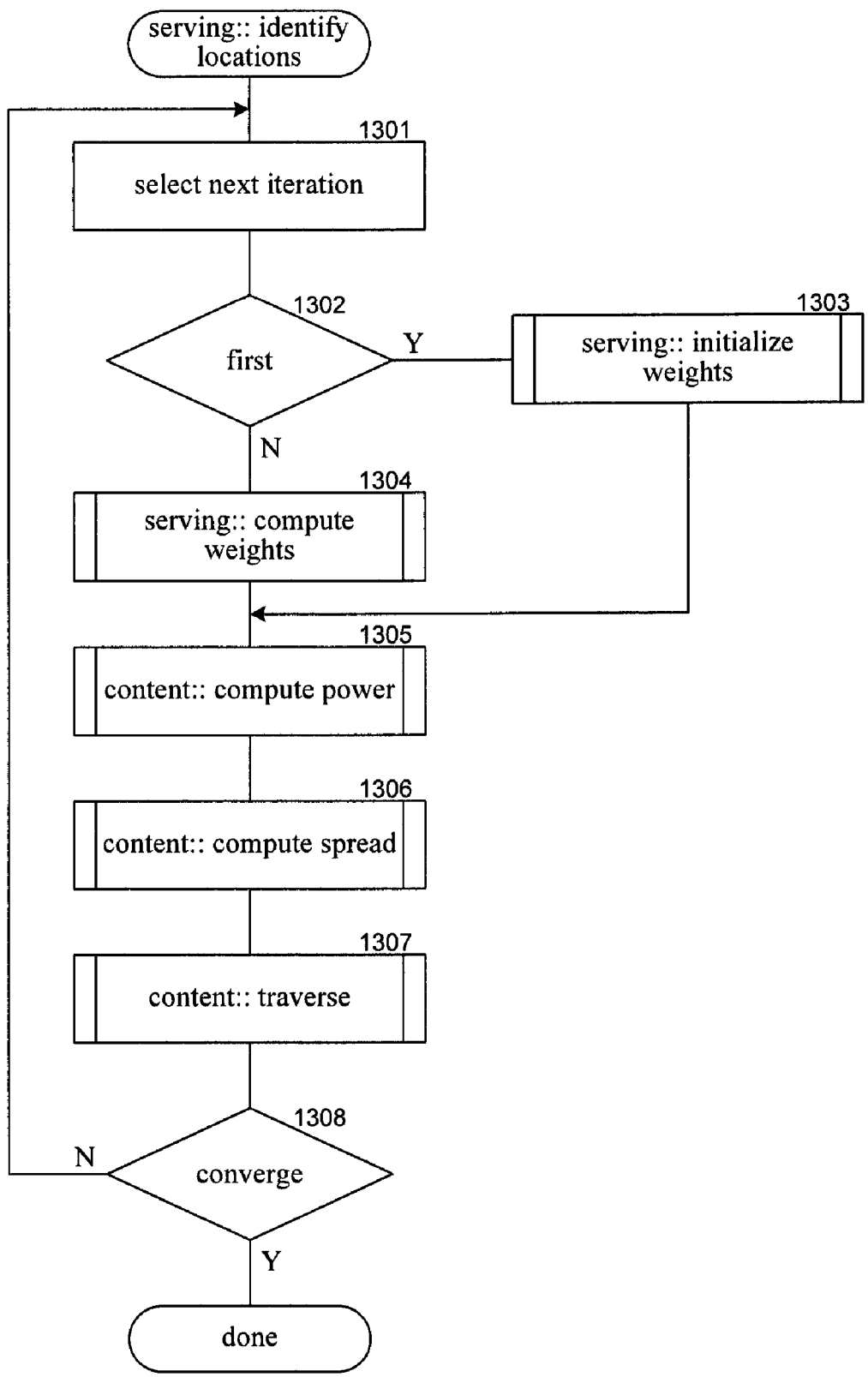
FIG. 13 is a flow diagram that illustrates the processing of the identify locations component of the serving location components in one embodiment.
Figure 14:
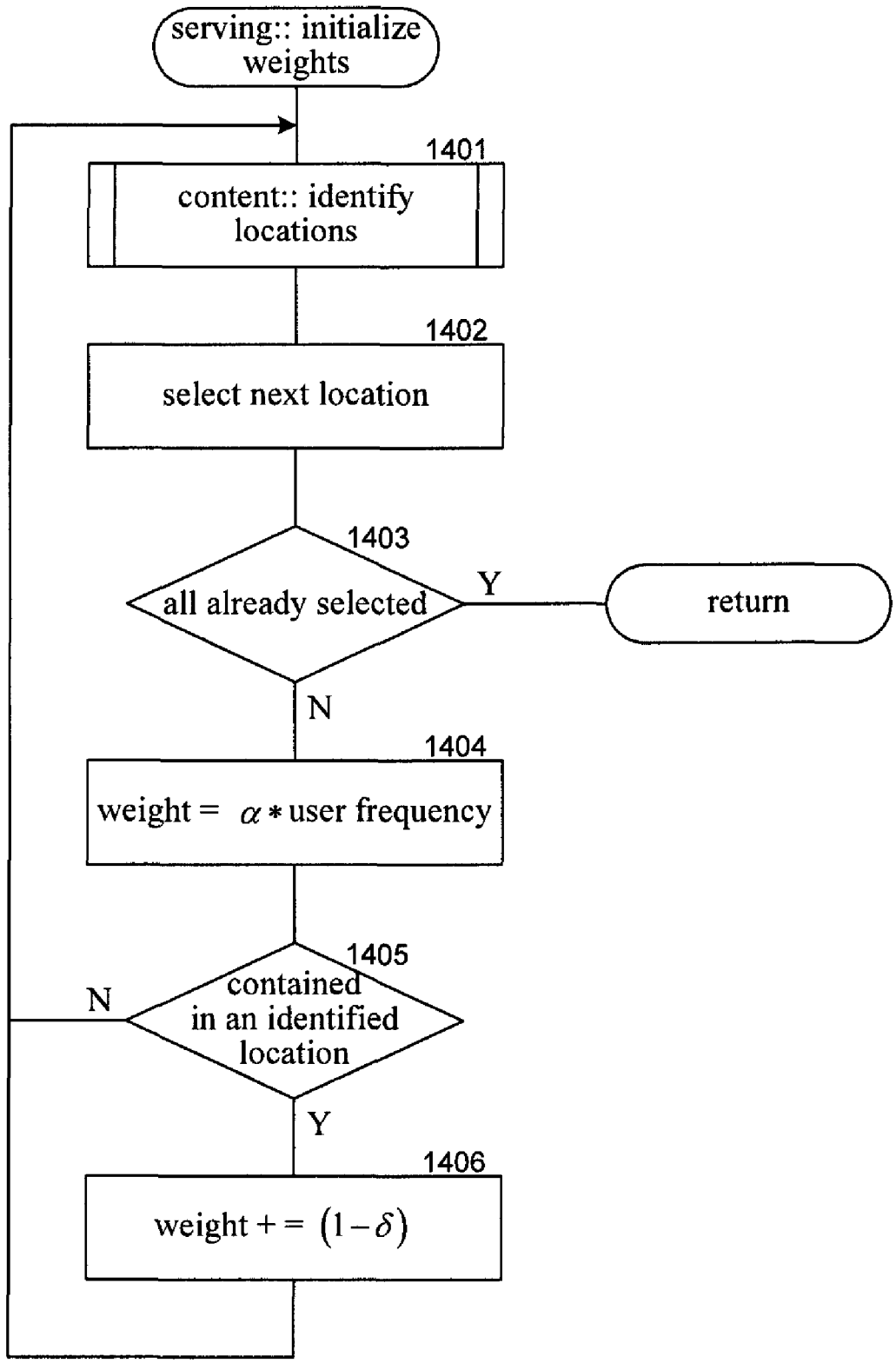
FIG. 14 is a flow diagram that illustrates the processing of the initialize weights component of the serving location components in one embodiment.
Figure 15:
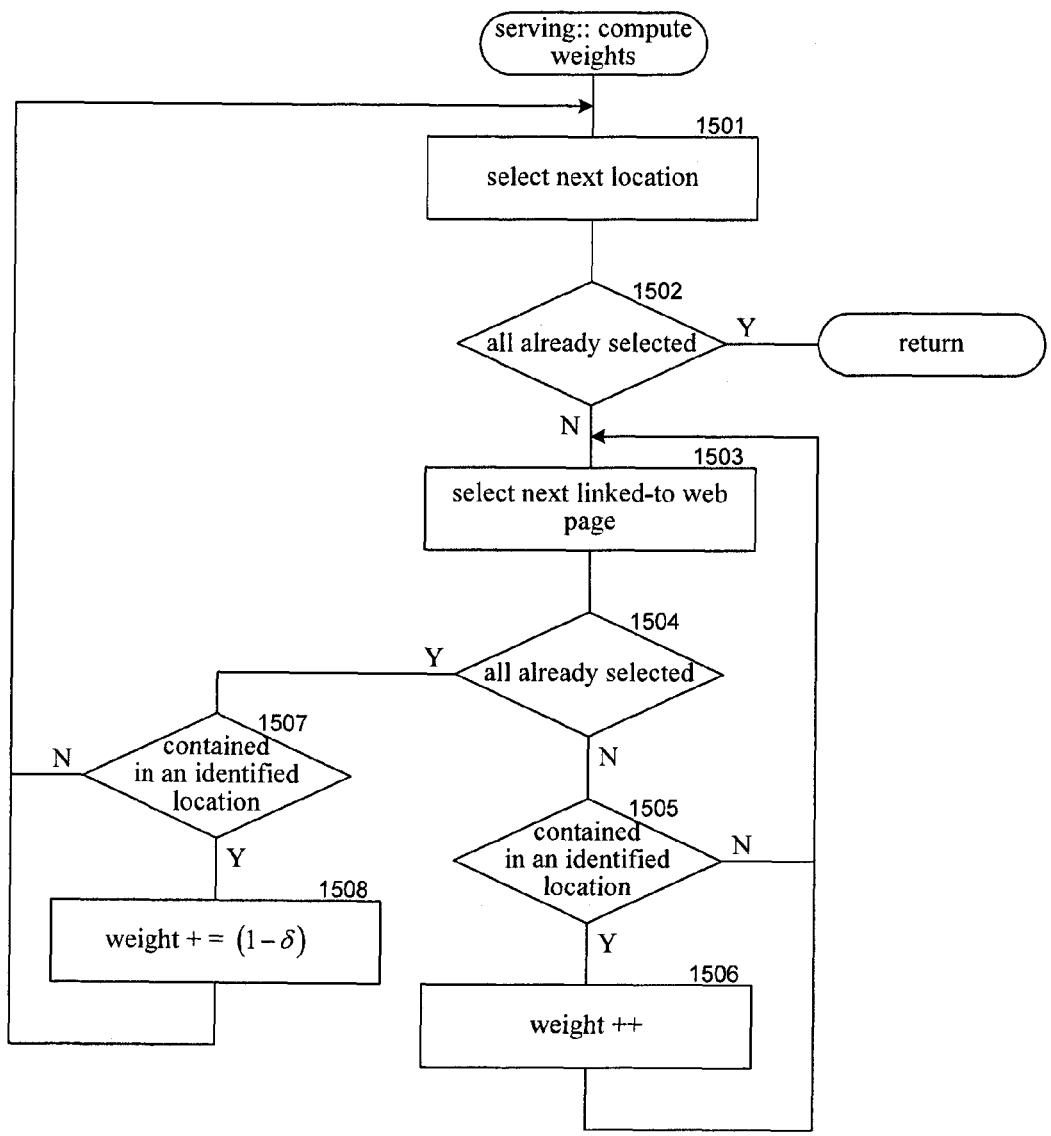
FIG. 15 is a flow diagram that illustrates the processing of the compute weights component of the serving location components in one embodiment.

FIGS. 13-15 are flow diagrams that illustrates the processing of the components of the serving location components of the location system in one embodiment. FIG. 13 is a flow diagram that illustrates the processing of the identify locations component of the serving location components in one embodiment. The component loops performing iterations that identify the serving locations of various web pages in parallel. The component identifies the serving locations of a geographic location for a target web page by factoring in the serving locations of the web pages that include a link to the target web page at each iteration. In block 1301, the component selects the next iteration. In decision block 1302, if this is the first iteration, then the component continues at block 1303, else the component continues at block 1304. In block 1303, the component invokes the initialize weights component of the serving location components to initialize the weights of the geographic locations for the web pages. In block 1304, the component invokes the compute weights component to compute the weights for the geographic locations for the web pages for this iteration. In block 1305, the component invokes the compute power component of the content location components to compute the power for the geographic hierarchy for each web page. In block 1306, the component invokes the compute spread component of the content location components to compute the spread for the geographic hierarchy for each web page. In block 1307, the component invokes the traverse component of the content location components to identify the serving locations of the geographic hierarchy for each web page. In decision block 1308, if the serving locations identified in this iteration and the last iteration are similar, then the component has converged on a solution and completes, else the component loops to block 1301 to select the next iteration.

FIG. 14 is a flow diagram that illustrates the processing of the initialize weights component of the serving location components in one embodiment. The component loops initializing the weights for the geographic locations for each web page. In block 1401, the component invokes the identify locations component of the content location components. In blocks 1402-1406, the component loops setting the weight for each location. In block 1402, the component selects the next location. In decision block 1403, if all the locations have already been selected, then the component returns, else the component continues at block 1404. In block 1404, the component calculates the contribution to the weights based on the frequency of users from the selected location accessing the target web page. In decision block 1405, if the selected location is contained in an identified location, then the component continues at block 1406, else the component loops to block 1401 to select the next location. In block 1406, the component increases the weight of the selected location to account for the selected location being contained in a content location. The component then loops to block 1401 to select the next location.

FIG. 15 is a flow diagram that illustrates the processing of the compute weights component of the serving location components in one embodiment. In block 1501, the component selects the next geographic location. In decision block 1502, if all the geographic locations have already been selected, then the component returns, else the component continues at block 1503. In blocks 1503-1506, the component loops factoring in the contribution to the weights of those web pages that link to the target web page. In block 1503, the component selects the next linked-from web page. In decision block 1504, if all the web pages have already been selected, then the component continues at block 1507, else the component continues at block 1505. In decision block 1505, if the selected geographic location is contained within an identified location, then the component continues at block 1506, else the component loops to block 1503 to select the next linked-from web page. In block 1506, the component increments the weight for the selected location and then loops to block 1503 to select the next linked-from web page. In decision block 1507, if the selected location is contained within an identified location, then the component continues at block 1508, else the component loops to block 1501 to select the next geographic location. In block 1508, the component increases the weight of the selected geographic location and loops to block 1501 to select the next geographic location.

From the foregoing, it will be appreciated that specific embodiments of the location system have been described herein for purposes of illustration, but that various modifications may be made without deviating from the spirit and scope of the invention. Accordingly, the invention is not limited except as by the appended claims.

We claim:

1. A computer system for identifying locations associated with web resources, comprising:
    a memory storing computer-executable instructions of
        a component for identifying a provider location associated with a web resource, the provider location of the web resource identifying the geographic location of an entity that provides the web resource;
        a component for identifying a content location associated with a web resource, the content location of the web resource identifying the geographic location that is a subject of the web resource; and
        a component for identifying a serving location associated with a web resource, the serving location of the web resource identifying the geographic scope that the web resource reaches; and
    a processor for executing the computer-executable instructions stored in the memory.

2. The computer system of claim 1 wherein the component for identifying a provider location includes a classifier that has been trained to classify locations of the web resource as being or not being provider locations.

3. The computer system of claim 2 wherein the classifier is a support vector machine.

4. The computer system of claim 1 wherein the component for identifying a provider location includes:
    a provider location classifier that inputs features of an address string of a web resource and outputs an indication of whether the address string represents a provider location of the web resource;
    an address string identification component that identifies an address string within a web resource;
    a feature extraction component that, for an identified address string, extracts from the web resource features of the identified address string; and
    a component that receives a web resource, identifies an address string within the web resource using the address string identification component, extracts features for the identified address string using the feature extraction component, and submits the extracted features to the provider location classifier to determine whether the identified address string represents a provider location of the web resource.

5. The computer system of claim 4 including:
    a component that generates the provider location classifier by:
        providing a plurality of web resources;
        identifying address strings of the web resources using the address string identification component;
        extracting features of the identified address strings using the feature extraction component;
        inputting labels for the identified address strings, a label indicating whether an identified address string represents a provider location of the web resource from which the identified address string was identified; and
        training the provider location classifier based on the extracted features and labels of the identified address strings.

6. The computer system of claim 4 wherein an extracted feature of an identified address string of a web page includes terms within a uniform resource locator of the web page.

7. A computing device for identifying provider locations associated with a web resource, the provider location of a web resource being a geographic location of an entity that provides the web resource, the web resource being a web page, the computing device comprising:
    a memory storing computer-executable instructions of
        a provider location classifier that inputs features of an address string of a web resource and outputs an indication of whether the address string represents a provider location of the web resource;
        an address string identification component that identifies an address string within a web resource;
        a feature extraction component that, for an identified address string, extracts from the web resource features of the identified address string, an extracted feature including level of the web resource within a web site;
        a component that receives a web resource, identifies an address string within the web resource using the address string identification component, extracts features for the identified address string using the feature extraction component, and submits the extracted features to the provider location classifier to determine whether the identified address string represents a provider location of the web resource; and
        a component that outputs an indication of whether the identified address string represents a provider location of the web resource; and
    a processor for executing the computer-executable instructions stored in the memory.

8. The computing device of claim 7 wherein an extracted feature of an identified address string of a web page includes terms within a uniform resource locator of the web page and within anchor text of the web page that indicate the web page may contain a provider location.

9. The computing device of claim 7 including:
    a component that generates the provider location classifier by:
        providing a plurality of web resources;
        identifying address strings of the web resources using the address string identification component;
        extracting features of the identified address strings using the feature extraction component;
        inputting labels for the identified address strings, a label indicating whether an identified address string represents a provider location of the web resource from which the identified address string was identified; and
        training the provider location classifier based on the extracted features and labels of the identified address strings.

10. The computing device of claim 9 wherein the training is based on a support vector machine.

11. The computing device of claim 7 wherein an extracted feature includes spatial position of the identified address string within the web page.

12. A computing device for identifying provider locations associated with a web resource, the provider location of a web resource being a geographic location of an entity that provides the web resource, the web resource being a web page, the computing device comprising:
    a memory storing computer-executable instructions of
        a provider location classifier that inputs features of an address string of a web resource and outputs an indication of whether the address string represents a provider location of the web resource;
        an address string identification component that identifies an address string within a web resource;
        a feature extraction component that, for an identified address string, extracts from the web resource features of the identified address string, an extracted feature including spatial position of the identified address string within the web resource;
        a component that receives a web resource, identifies an address string within the web resource using the address string identification component, extracts features for the identified address string using the feature extraction component, and submits the extracted features to the provider location classifier to determine whether the identified address string represents a provider location of the web resource; and
        a component that outputs an indication of whether the identified address string represents a provider location of the web resource; and
    a processor for executing the computer-executable instructions stored in the memory.

13. A method performed by a computing device having computer-executable instructions stored in a memory of the computing device for generating a provider location classifier of a web resource, the provider location classifier for determining whether an address string of a web resource represents a provider location, the provider location of a web resource being a geographic location of an entity that provides the web resource, the web resource being a web gage, the method comprising:
    providing a plurality of web resources;
    identifying address strings of the web resources;
    extracting features of the identified address strings, an extracted feature including level of the web resource within a web site;
    inputting labels for the identified address strings, a label indicating whether an identified address string represents a provider location of the web resource from which the identified address string was identified; and
    training the provider location classifier based on the extracted features and labels of the identified address strings.

14. The method of claim 13 wherein the training is based on a support vector machine.

15. The method of claim 13 including classifying an address string of a web resource by a method including:
    receiving the web resource;
    identifying an address string within the web resource;
    extracting features for the identified address string; and
    submitting the extracted features to the provider location classifier to determine whether the identified address string represents a provider location of the web resource.

16. A method performed by a computing device having computer-executable instructions stored in a memory of the computing device for generating a provider location classifier of a web resource, the provider location classifier for determining whether an address string of a web resource represents a provider location, the provider location of a web resource being a geographic location of an entity that provides the web resource, the web resource being a web page, the method comprising:
    providing a plurality of web resources;
    identifying address strings of the web resources;
    extracting features of the identified address strings, an extracted feature including spatial position of the identified address string within the web resource;
    inputting labels for the identified address strings, a label indicating whether an identified address string represents a provider location of the web resource from which the identified address string was identified; and
    training the provider location classifier based on the extracted features and labels of the identified address strings.

17. The method of claim 16 wherein an extracted feature of an identified address string of a web page includes terms within anchor text of the web page that indicate the web page may contain a provider location.

18. The method of claim 16 wherein an extracted feature includes spatial position of the identified address string within the web page.

* * * * *